(12) United States Patent
Murfey (10) Patent No.: US 10,894,569 B2
(45) Date of Patent: Jan. 19, 2021

(54) TRACK SUPPORT MEMBER AND ASSEMBLY

(71) Applicant: DEERE & COMPANY, Moline, IL (US)

(72) Inventor: Peter J. Murfey, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 396 days.

(21) Appl. No.: 15/946,883

(22) Filed: Apr. 6, 2018

(65) Prior Publication Data

US 2019/0308677 A1 Oct. 10, 2019

(51) Int. Cl.
| | |
|---|---|
| *B62D 55/10* | (2006.01) |
| *B62D 55/084* | (2006.01) |
| *B62D 55/125* | (2006.01) |
| *B62D 55/065* | (2006.01) |

(52) U.S. Cl.
CPC ........... *B62D 55/10* (2013.01); *B62D 55/084* (2013.01); *B62D 55/125* (2013.01); *B62D 55/065* (2013.01)

(58) Field of Classification Search
CPC ..... B62D 55/10; B62D 55/125; B62D 55/084
See application file for complete search history.

(56) References Cited

U.S. PATENT DOCUMENTS

| | | |
|---|---|---|
| 6,401,847 B1 | 6/2002 | Lykken |
| 6,402,169 B1 | 6/2002 | Schafer et al. |
| 7,077,216 B2 * | 7/2006 | Juncker ................ A01B 31/00 172/684.5 |
| 8,430,188 B2 * | 4/2013 | Hansen ................ B62D 55/30 180/9.26 |
| 9,010,781 B2 | 4/2015 | Pare et al. |
| 9,193,383 B2 | 11/2015 | Pare et al. |
| 9,505,432 B2 | 11/2016 | Pare et al. |
| 2007/0017714 A1 * | 1/2007 | Brazier ................ B62D 55/04 180/9.3 |

(Continued)

FOREIGN PATENT DOCUMENTS

| | | |
|---|---|---|
| EP | 2727802 A1 | 5/2014 |
| JP | 2000016356 A | 1/2000 |

OTHER PUBLICATIONS

German Search Report issued in counterpart application No. 102019203002.5 dated Mar. 13, 2020 (12 pages).

*Primary Examiner* — Kip T Kotter
(74) *Attorney, Agent, or Firm* — Taft Stettinius & Hollister LLP; Stephen F. Rost (57) ABSTRACT

A track support member and drive assembly are disclosed. The drive assembly includes the track support member, an axle housing, driveshaft, hub, drive wheel, track drive frame, rollers and track. The driveshaft extends through the axle housing. The track support member is connected to the axle housing, and the driveshaft extends through the track support member. The hub rotates with the driveshaft, and the drive wheel. The drive frame is connected to the track support member, and the rollers are connected to the drive frame. The track is connected to the drive wheel and rollers. Rotation of the driveshaft rotates the hub and drive wheel which rotates the track about the drive wheel and rollers. The track support member can be a single integrated piece including an attachment ring for connecting to the axle housing, and undercarriage support arm(s) for connecting to the track drive frame.

18 Claims, 5 Drawing Sheets

(56) References Cited

U.S. PATENT DOCUMENTS

2010/0060075 A1* 3/2010 Hansen ................ B62D 55/084
                                                    305/15
2014/0069730 A1   3/2014 Lafreniere et al.
2017/0280640 A1* 10/2017 Hansen .................. B62D 55/10
2017/0305483 A1* 10/2017 Rehberg ............... B62D 55/065

* cited by examiner

TRACK SUPPORT MEMBER AND ASSEMBLY

FIELD OF THE DISCLOSURE

The present disclosure relates to machinery with a track drive, and more particularly to track support arms for use with tracks.

BACKGROUND

A track support member is used to connect an axle assembly of a vehicle to a track assembly. Current track support members are integrated into another structural housing which limits access and assembly. This requires the track support member to be assembled and removed together with the integrated structural components which can be cumbersome during manufacturing and service. This also may require the disturbance of a wet joint to remove of the track support member.

When track support members are part of the axle housing, the track support arms extend from the axle housing during assembly which makes the axle housing heavier and more cumbersome during interior and exterior assembly of axle components. Also when track support members are part of the axle housing, removal of the track support member requires removal of the axle housing which exposes lubricants and other interior components of the axle during maintenance of the track support member. This also may require dealing with spilling or leaking oil or other fluid on the ground when working on the track support member.

The undercarriage support arms of the track support member support the weight of the vehicle, and experience the tractive forces of propelling the vehicle over terrain, and the impacts of loads from rough terrain. Thus to withstand these forces, the track support member is typically made from ductile iron or other stronger more impact resistant material as opposed to gray iron which is more brittle and susceptible to cracking/breaking. When the track support member and axle housing are a single piece, the entire component has to be made of the same stronger more expensive material. If the track support member is separate from the axle housing, the axle housing does not need to withstand the extreme forces of the track support member and can be made from a less-expensive material.

It would be desirable to have the track support member and arms be a separate component from the axle housing or other axle or track components.

SUMMARY

An axle and track drive assembly for a vehicle is disclosed. The axle and track drive assembly includes an axle housing, a driveshaft, a hub, a track support member, a drive wheel, a track drive frame, a plurality of rollers and a track. The driveshaft extends through the axle housing, and the driveshaft is rotatable in the forward and reverse directions. The hub can be mechanically coupled or integral to the driveshaft to rotate with the driveshaft. The track support member is rigidly connected to the axle housing, and the driveshaft extends through the track support member. The drive wheel is connected to the hub. The track drive frame is connected to the track support member, and the plurality of rollers are connected to the drive frame. The track is connected to the drive wheel and the plurality of rollers. Rotation of the driveshaft rotates the hub and drive wheel which rotates the track about the drive wheel and the plurality of rollers.

The track support member can include an attachment ring for connection of the track support member to the axle housing, where the axle housing and the driveshaft extend through the attachment ring. The track support member can include an undercarriage support arm, where the track drive frame is connected to the undercarriage support arm. The undercarriage support arm can have a plurality of arm holes that provide a plurality of mounting locations for connection of the track drive frame to the track support member.

The track support member can be made of a first material and the axle housing can be made of a second material, where the first material is less brittle than the second material. The track support member can be a single integrated piece comprising the attachment ring, and first and second undercarriage support arms.

The axle housing and the driveshaft can extend through the attachment ring. Each of the first and second undercarriage support arms can include a plurality of arm holes for connection of the track drive frame to the first and second undercarriage support arms. When the attachment ring is connected to the axle housing and the track drive frame is connected to the first and second undercarriage support arms, the center of the attachment ring can be above the first and second undercarriage support arms.

A track support member is disclosed for an axle assembly of a vehicle with a track drive assembly. The track support member includes an attachment ring and a first undercarriage support arm. A driveshaft of the vehicle extends through the attachment ring where the driveshaft is rotatable in the forward and reverse directions. The track drive assembly is connected to the first undercarriage support arm. Rotation of the driveshaft of the vehicle rotates a track of the track drive assembly.

The attachment ring can include a plurality of attachment holes for connection of the attachment ring to an axle housing of the vehicle, where the driveshaft extends through the interior of the axle housing. The first undercarriage support arm can include a plurality of arm holes for connection of the track drive assembly to the track support member. The attachment ring can be generally circular and have a center, such that when the attachment ring is connected to an axle housing and the undercarriage support arm is connected to the track drive assembly, the center of the attachment ring is above the undercarriage support arm. The track support member can be a single integrated piece that includes the attachment ring and the first undercarriage support arm.

The track support member can also include a second undercarriage support arm where the track drive assembly is connected to the first and second undercarriage support arms. Each of the first and second undercarriage support arms can include a plurality of arm holes for connection of the track drive assembly to the track support member. The track support member can be a single integrated piece that includes the attachment ring and the first and second undercarriage support arms. The track support member can be made of ductile iron.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
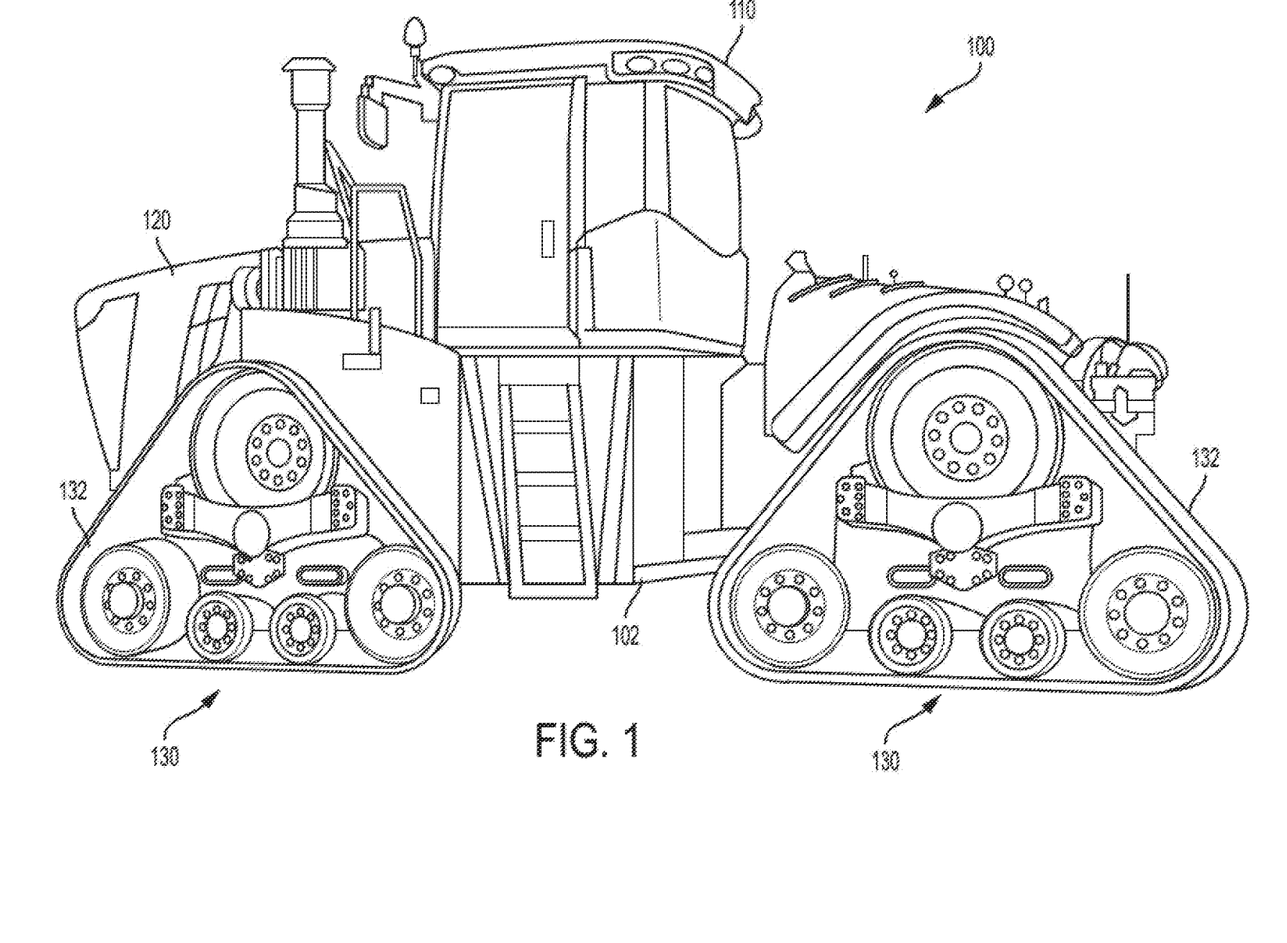
FIG. 1 illustrates an exemplary vehicle with track drives.

FIG. 1 illustrates an exemplary track drive vehicle 100, in this example a tractor, including a vehicle undercarriage 102, an operator cab 110, an engine compartment that holds an engine 120, and track drive assemblies 130 with tracks 132. FIG. 1 only shows the left side of the vehicle 100 with front and rear track drive assemblies 130; the right side of the vehicle 100 also includes front and rear track drive assemblies 130. The vehicle undercarriage 102 supports the operator cab 110 and engine 120. The track drive assemblies 130 support the vehicle undercarriage 102 above the ground, and provide propelling force to the vehicle 100. The track support member disclosed herein can be used on either or both of the front and rear track drive assemblies 130. The operator cab 110 provides the operator with a clear view of the area being worked by the vehicle 100. The operator cab 110 includes controls for the operator to control the engine 120 and the track drive assemblies 130.

Figure 2:
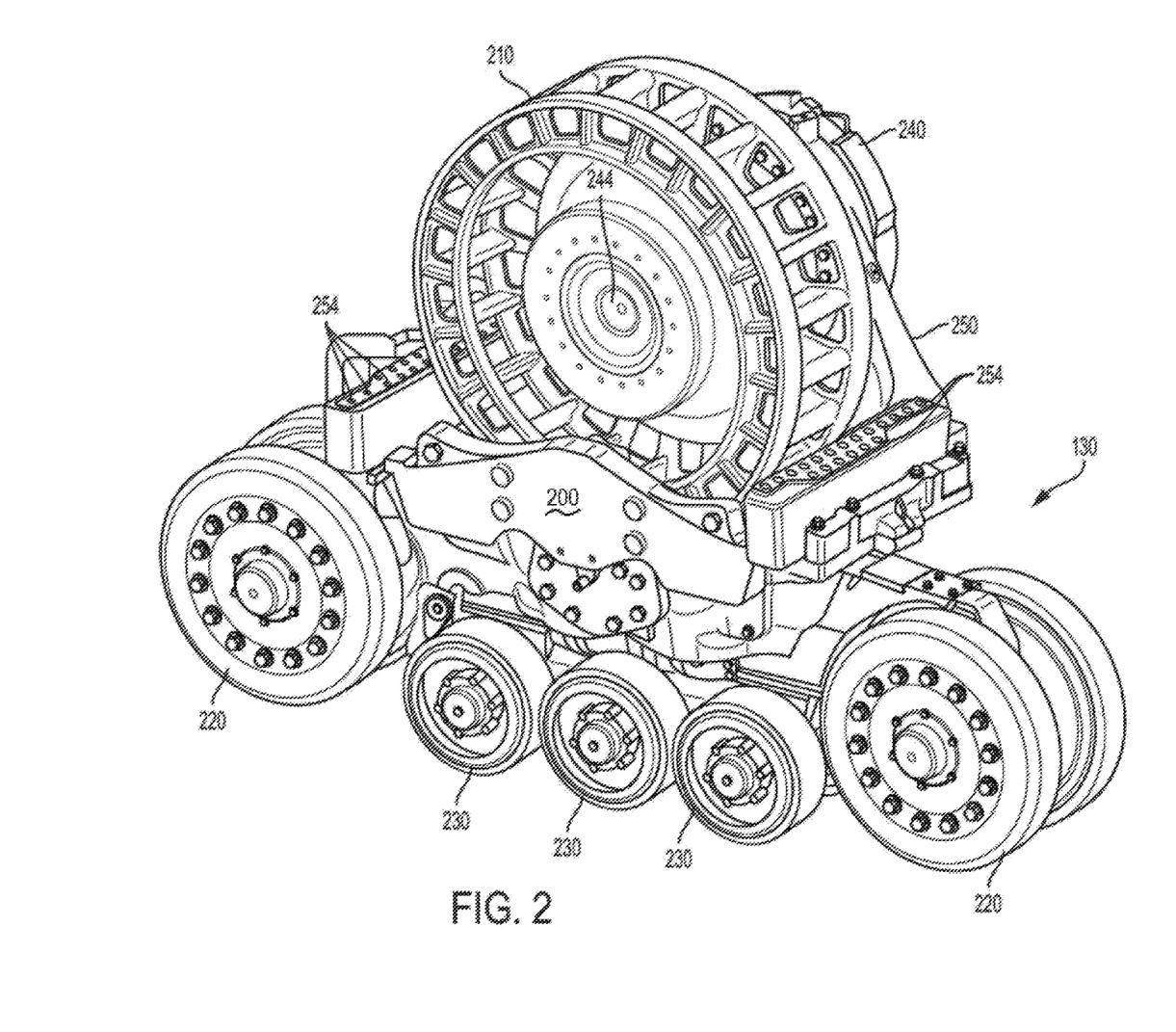
FIG. 2 illustrates an outside view of an exemplary track drive assembly and connection to the vehicle axle assembly.
Figure 3:
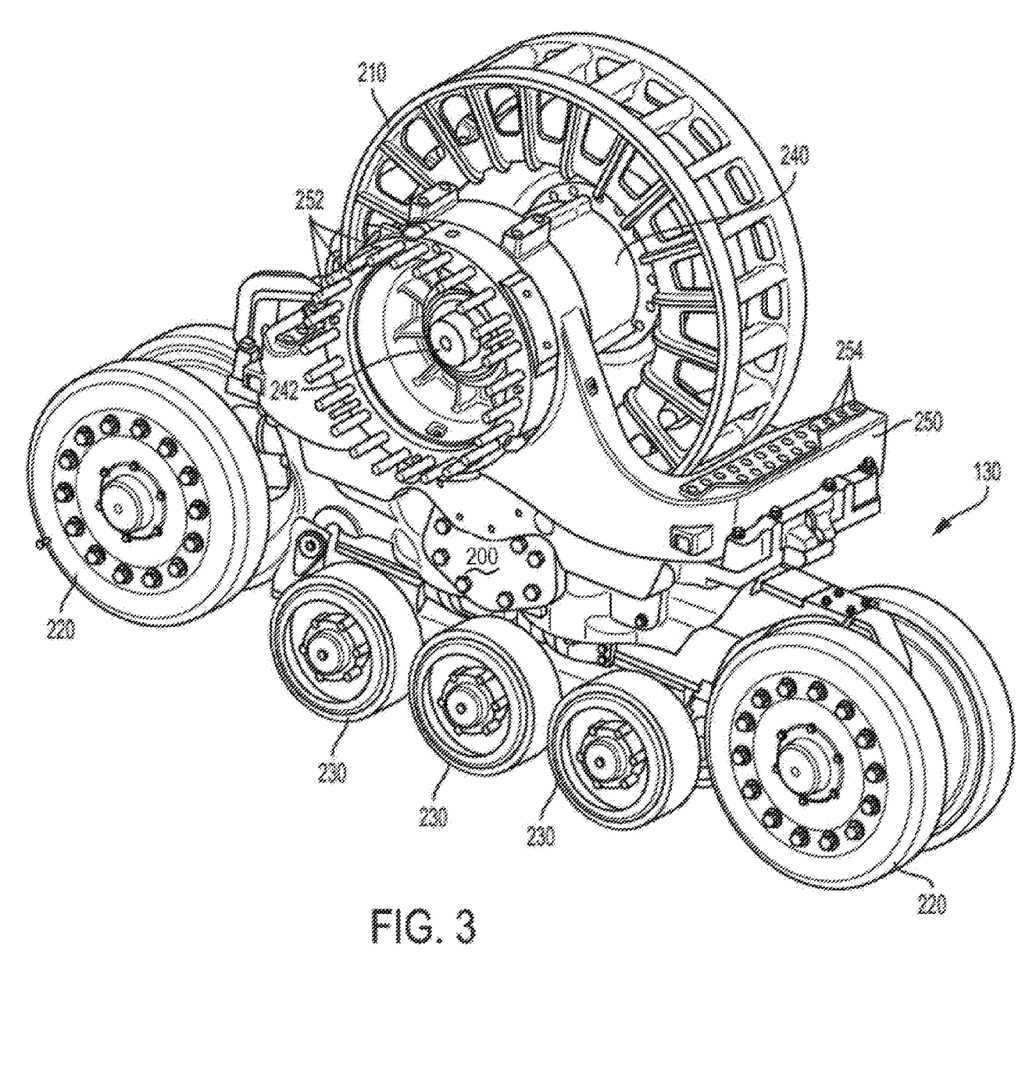
FIG. 3 illustrates an inside view of the exemplary track drive assembly and connection to the vehicle axle assembly.

FIG. 2 illustrates an outside view and FIG. 3 illustrates an inside view of an exemplary track drive assembly 130 and connection to the axle assembly of the vehicle 100 (with the track 132 removed for clarity). The track drive assembly 130 includes a drive frame 200, a drive wheel 210, idlers 220, mid rollers 230, and track 132 (shown in FIG. 1). The track drive assembly 130 is coupled to the vehicle 100 through a track support member 250, an axle housing 240, a drive shaft 242 and a hub 244. The drive shaft 242 is driven by power from the engine 120.

Power is transferred to the driveshaft 242 which extends through the axle housing 240 and the track support member 250 to power the hub 244, and the drive wheel 210 of the track drive assembly 130 is coupled to the hub 244. The axle housing 240 can be mechanically coupled to a differential case of the vehicle 100. The track support member 250 can be mechanically coupled to the axle housing 240 and the differential case of the vehicle 100 using a plurality of attachment bolts 252 that extend through the track support member 250 and the axle housing 240 into connections on the differential case of the vehicle 100. The drive frame 200 of the track drive assembly 130 is connected to the track support member 250 using a plurality of arm bolts 254. The idlers 220 and mid rollers 230 are connected to the drive frame 200. The track 132 moves about the drive wheel 210, idlers 220 and mid rollers 230. The track support member 250 and drive frame 200 support the components of the track drive assembly 130. The drive wheel 210 is coupled to the hub 244 which rotates with the driveshaft 242. The drive wheel 210 drives the track 132 clockwise or counterclockwise around the drive wheel 210, idlers 220 and mid rollers 230 to propel the vehicle 100.

Figure 4:
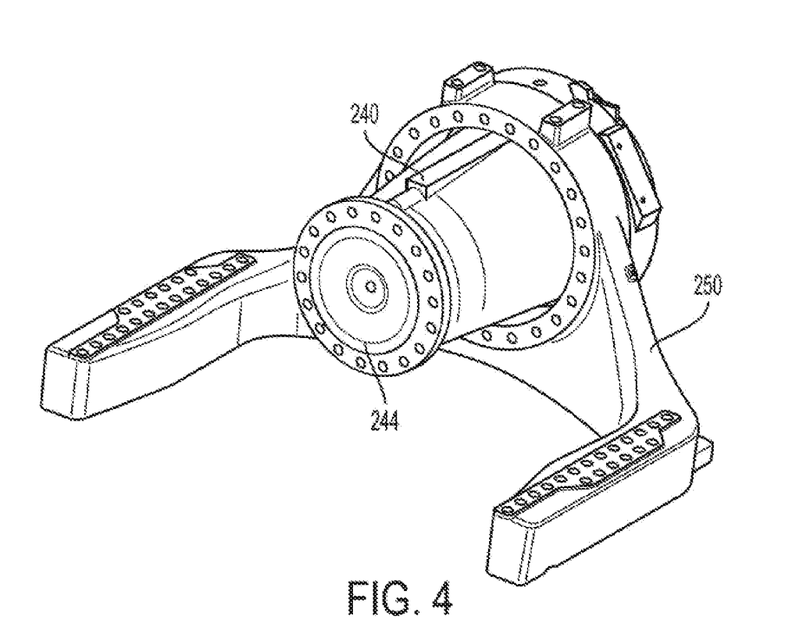
FIG. 4 illustrates an outside view of an exemplary axle assembly without a track assembly.
Figure 5:
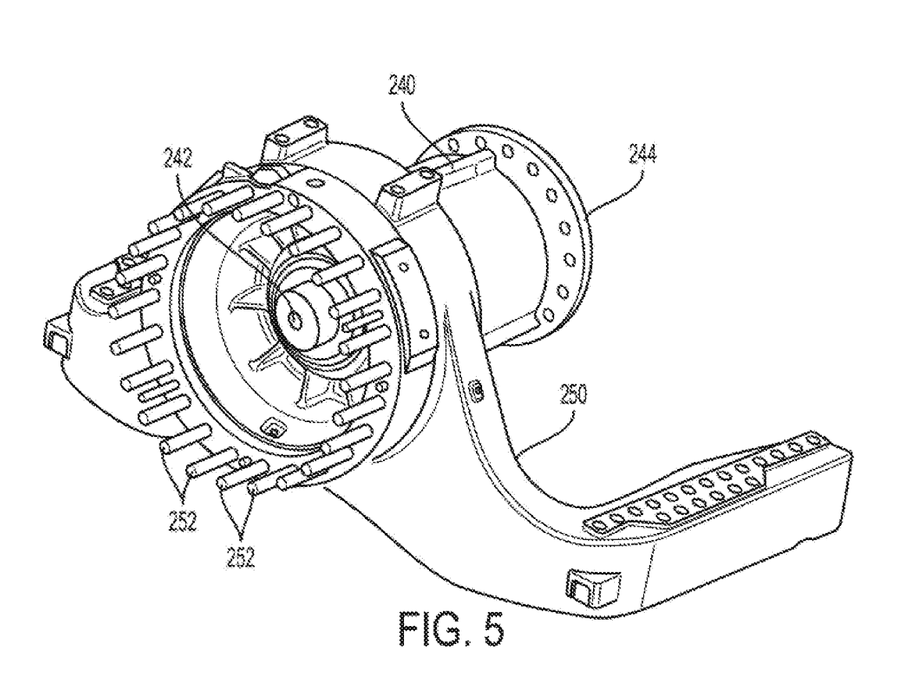
FIG. 5 illustrates an inside view of the exemplary axle assembly without the track assembly.

FIG. 4 illustrates an outside view and FIG. 5 illustrates an inside view of components of an exemplary axle assembly without a track assembly. FIGS. 4 and 5 show the track support member 250, the structural housing 240, the drive shaft 242, the hub 244, and the plurality of attachment bolts 252 that rigidly connect the structural housing 240 and the track support member 250 to the vehicle 100.

Figure 6:
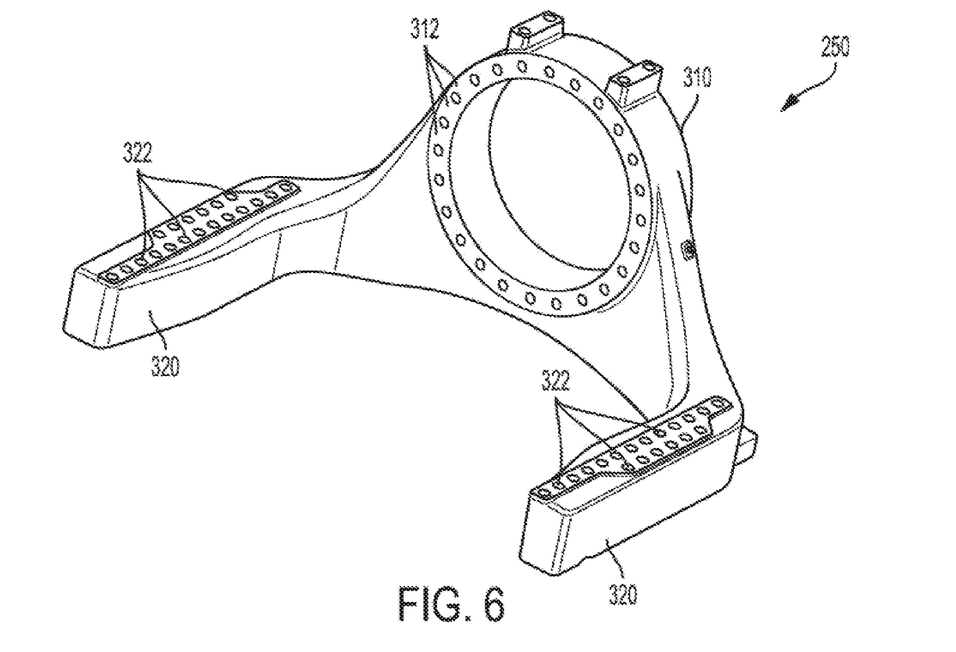
FIG. 6 illustrates an outside view of an exemplary embodiment of a track support member.
Figure 7:
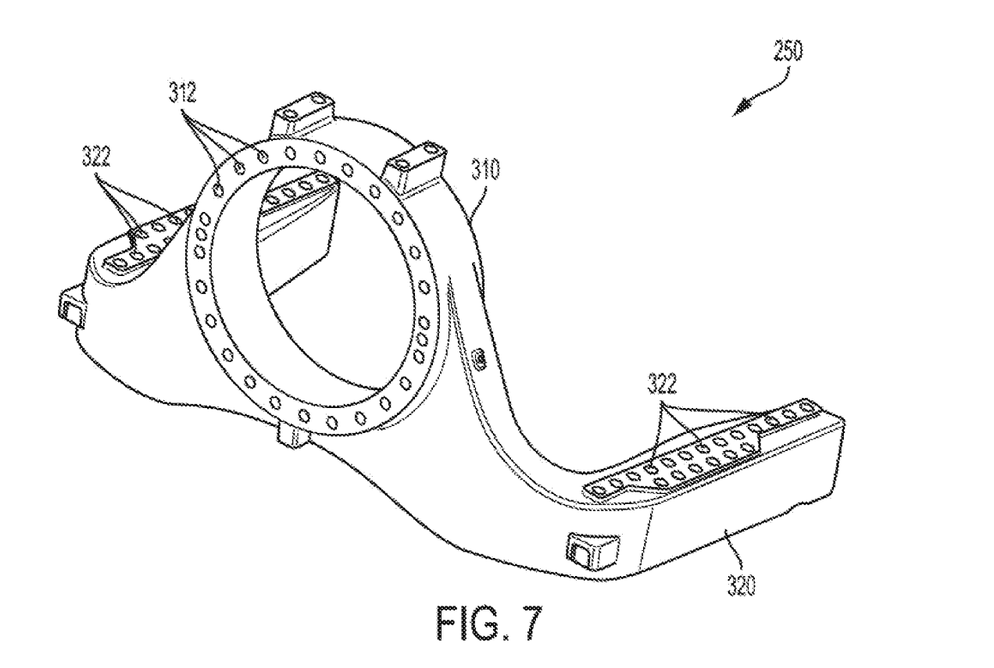
FIG. 7 illustrates an inside view of the exemplary embodiment of the track support member.

FIG. 6 illustrates an outside view and FIG. 7 illustrates an inside view of an exemplary embodiment of the track support member 250. The exemplary track support member 250 is a single integrated piece that includes an attachment ring 310 and integrated undercarriage support arms 320. The attachment ring 310 includes a plurality of attachment holes 312 for the attachment bolts 252 to pass through for connecting the track support member 250 to the vehicle 100. The assembly can include one or more spacers between the axle housing 240 and the differential case in the vehicle 100 for different track settings. Each of the integrated undercarriage support arms 320 includes a plurality of arm holes 322 for the arm bolts 254 to pass through for connecting the track support member 250 to the track assembly 130.

The driveshaft 242 passes through the axle housing 240 which passes through the attachment ring 310 of the track support member 250, and the driveshaft 242 is coupled to the hub 244 and the drive wheel 210. Rotation of the driveshaft 242 provides rotational power to the hub 244 and the drive wheel 210 to drive the track 132 and vehicle 100 forward and backward. The connection between the hub 244 and the drive wheel 210 can include drive wheel spacers for different track settings.

The integrated undercarriage support arms 320 can include multiple arm holes 322 for connection of the drive frame 200 of the track drive assembly 130 to the track support member 250. The track tension as well as undercarriage vertical, fore/aft and lateral loads are reacted through the support arms 320. The arm holes 322 of the integrated undercarriage support arms 320 can be evenly spaced or spaced as desired to provide multiple track mounting location options to accommodate different tread settings or tread widths. For example, the track frame 200 can be mounted to a plurality of inner or a plurality of outer mounting holes 322 of the support arms 320 to space the track assembly 130 at the desired tread setting.

A track support member 250 that is separate from the axle housing 240 provides advantages during assembly and maintenance of a vehicle. Prior track support members were part of the axle housing which meant the track support arms were extending from the axle housing during assembly which made the axle housing heavier and more cumbersome during interior and exterior assembly of axle components. Having the track support member 250 separate from the axle housing 240 enables the axle assembly to be performed without the weight or obstruction of the track support arms. After the axle assembly is complete, the track support member 250 can be connected to the axle housing. A few bolts can be used to attach the axle housing to the differential case to complete axle assembly and seal the internal hydraulics and other axle components. Then the track support member can be slipped over the axle housing and a plurality of attachment bolts can be used to connect the track support member to the axle housing and the vehicle. During vehicle maintenance, having a separate track support member also enables removal of the track support member without removal of the axle housing which avoids having to expose lubricants and other interior components of the axle during maintenance of the track support member. This also avoids spilling or leaking oil or other fluid on the ground when working on the track support member 250.

The undercarriage support arms 320 of the track support member 250 support the weight of the vehicle, and experience the tractive forces of propelling the vehicle over terrain, and the impacts of loads from rough terrain. Thus to withstand these forces, the track support member is typically made from ductile iron or other stronger more impact resistant material as opposed to gray iron which is more brittle and susceptible to cracking/breaking. With the track support member 250 being separate from the axle housing 240 it may not be necessary to use this same stronger more expensive material for the axle housing. Thus, the track support member 250 can be made from a more expensive, stronger, less brittle material and the axle housing 240 can be made from a less-expensive material, for example gray iron.

The track support member 250 being separate from the axle housing can also aid in adjustment of the axle center line above the ground. In a wheeled vehicle the axle center line usually passes through the center of the wheel which typically places the vehicle undercarriage at or near the axle center line. In the generally triangular shape of the track drive assembly 130, the center line of the axle passes through the drive wheel 210, and the desired geometry is typically for the vehicle undercarriage to be below this level. Having the undercarriage support arms 320 of the track support member 250 offset below the center of the attachment ring 310 helps obtain the desired geometry for the track drive assembly 130.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

I claim:

1. An axle and track drive assembly for a vehicle; the axle and track drive assembly comprising:
    an axle housing;
    a driveshaft that extends through the axle housing, where the driveshaft is rotatable in the forward and reverse directions;
    a hub that rotates with the driveshaft;
    a track support member rigidly connected to the axle housing, where the driveshaft extends through the track support member;
    a drive wheel coupled to the hub;
    a track drive frame coupled to the track support member;
    a plurality of rollers coupled to the drive frame;
    a track connected to the drive wheel and the plurality of rollers;
    wherein rotation of the driveshaft rotates the hub and the drive wheel which rotates the track about the drive wheel and the plurality of rollers;
    wherein the track support member is a single integrated piece comprising an attachment ring and an undercarriage support arm, where the attachment ring is connected to the axle housing and the undercarriage support arm is connected to the track drive frame.

2. The axle and track drive assembly of claim 1, wherein the axle housing and the driveshaft extend through the attachment ring.

3. The axle and track drive assembly of claim 1, wherein the undercarriage support arm extends outward from the attachment ring away from the vehicle and parallel to the driveshaft.

4. The axle and track drive assembly of claim 3, wherein the undercarriage support arm has a plurality of arm holes that provide a plurality of mounting locations for connection of the track drive frame to the track support member.

5. The axle and track drive assembly of claim 1, wherein the track support member is made of a first material and the axle housing is made of a second material.

6. An axle and track drive assembly, for a vehicle; the axle and track drive assembly comprising:
    an axle housing;
    a driveshaft that extends through the axle housing, where the driveshaft is rotatable in the forward and reverse directions;
    a hub that rotates with the driveshaft;
    a track support member rigidly connected to the axle housing, where the driveshaft extends through the track support member;
    a drive wheel coupled to the hub;
    a track drive frame coupled to the track support member;
    a plurality of rollers coupled to the drive frame;
    a track connected to the drive wheel and the plurality of rollers;
    wherein rotation of the driveshaft rotates the hub and the drive wheel which rotates the track about the drive wheel and the plurality of rollers;
    wherein the track support member is a single integrated piece comprising an attachment ring, and first and second undercarriage support arms;
    wherein the attachment ring is connected to the axle housing and the track drive frame is connected to the first and second undercarriage support arms.

7. The axle and track drive assembly of claim 6, wherein the axle housing and the driveshaft extend through the attachment ring.

8. The axle and track drive assembly of claim 7, wherein each of the first and second undercarriage support arms have a plurality of arm holes for connection of the track drive frame to the first and second undercarriage support arms.

9. The axle and track drive assembly of claim 8, wherein when the attachment ring is connected to the axle housing and the track drive frame is connected to the first and second undercarriage support arms, the center of the attachment ring is above the first and second undercarriage support arms.

10. The axle and track drive assembly of claim 9, wherein the track support member is made of a first material and the axle housing is made of a second material.

11. A track support member for an axle assembly of a vehicle with a track drive assembly; the track support member comprising:

an attachment ring where a driveshaft of the vehicle extends through the attachment ring and the driveshaft is rotatable in the forward and reverse directions;

a first undercarriage support arm where the track drive assembly is connected to the first undercarriage support arm;

wherein rotation of the driveshaft of the vehicle rotates a track of the track drive assembly;

wherein the track support member is a single integrated piece comprising the attachment ring and the first undercarriage support arm; and wherein the first undercarriage support arm is configured to extend outward from the attachment ring away from the vehicle and parallel to the driveshaft.

12. The track support member of claim 11, wherein the attachment ring includes a plurality of attachment holes for connection of the attachment ring to an axle housing of the vehicle, where the driveshaft extends through the interior of the axle housing.

13. The track support member of claim 12, wherein the first undercarriage support arm includes a plurality of arm holes for connection of the track drive assembly to the track support member.

14. The track support member of claim 13, wherein the attachment ring is generally circular and has a center, and when the attachment ring is connected to an axle housing and the undercarriage support arm is connected to the track drive assembly, the center of the attachment ring is above the undercarriage support arm.

15. The track support member of claim 11, further comprising a second undercarriage support arm where the track drive assembly is connected to the first and second undercarriage support arms;

wherein the track support member is a single integrated piece comprising the attachment ring and the first and second undercarriage support arms; and wherein the first and second undercarriage support arms are configured to extend outward from the attachment ring away from the vehicle and parallel to the driveshaft.

16. The track support member of claim 15, wherein each of the first and second undercarriage support arms includes a plurality of arm holes for connection of the track drive assembly to the track support member.

17. The track support member of claim 16, wherein the attachment ring is generally circular and has a center, and when the attachment ring is connected to an axle housing and the first and second undercarriage support arms are connected to the track drive assembly, the center of the attachment ring is above the first and second undercarriage support arms.

18. The track support member of claim 17, wherein the track support member is made of ductile iron.

* * * * *